Jan. 27, 1959  A. W. MARTIN  2,871,169
PURIFICATION OF METHYLISOBUTYLKETONE
Filed Oct. 11, 1955
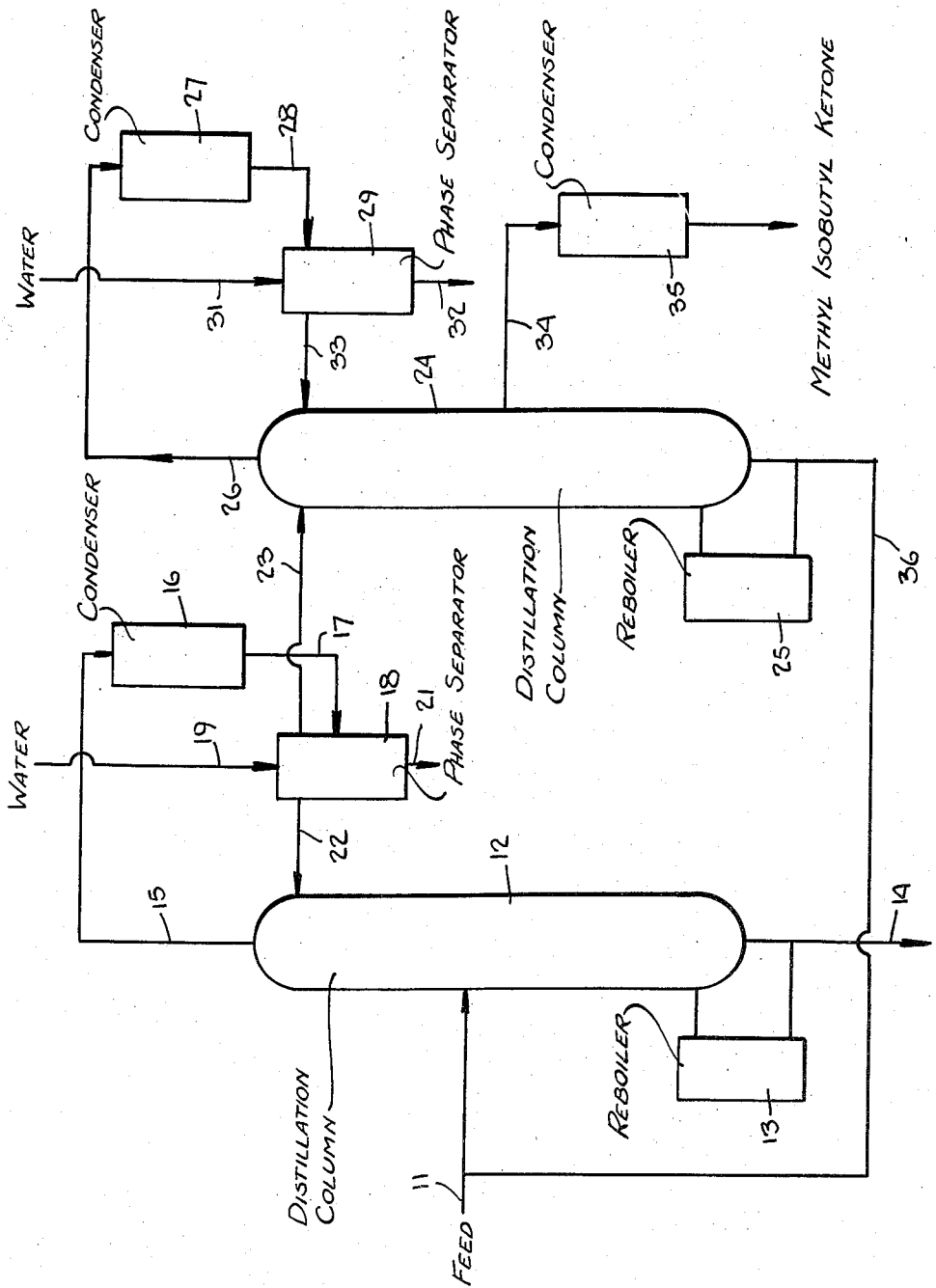
INVENTOR.
ALFRED WILLIAM MARTIN
BY
ATTORNEYS

United States Patent Office 2,871,169
Patented Jan. 27, 1959

2,871,169

PURIFICATION OF METHYLISOBUTYLKETONE

Alfred W. Martin, Corpus Christi, Tex., assignor to Celanese Corporation of America, New York, N. Y., a corporation of Delaware Application October 11, 1955, Serial No. 539,812

5 Claims. (Cl. 202—60)

This invention relates to the purification of methylisobutylketone and relates more particularly to an improved process for the purification of methylisobutylketone by a plurality of distillations and water extractions.

Methylisobutylketone may be produced by the hydrogenation of mesityl oxide. The product obtained by this process contains a large number of impurities including mesityl oxide, methylisobutylcarbinol, acetone, isopropanol, hexylene glycol and diacetone alcohol, the total quantity of impurities ranging up to about 10% or in extreme cases up to about 30% by weight. The presence of these impurities would interfere seriously with many of the uses to which it is desired to put the methylisobutylketone. However, the removal of these impurities by simple distillation has not been found commercially feasible owing to the close boiling points of the materials and the formation of binary and higher azeotropes.

Accordingly, an important object of this invention is to provide a novel process for the purification of methylisobutylketone that has been produced by the hydrogenation of mesityl oxide which will be free from the foregoing and other disadvantages.

Other objects of this invention will be apparent from the following detailed description and claims.

According to the present invention, the purification of methylisobutylketone produced by the hydrogenation of mesityl oxide is carried out in a highly efficient and economical manner by subjecting the same to a plurality of distillations and water extractions. Through the use of this process, there is obtained a highly purified product which may be used in a wide variety of applications.

The drawing is a diagrammatic flow sheet of the process of this invention.

Referring now to the drawing, the reference numeral 11 designates a feed line through which the impurity-containing methylisobutylketone is entered into a distillation column 12 provided with a reboiler 13. The column 12 is operated at a head temperature above about 104° C. at atmospheric pressure to distill overhead the methylisobutylketone, while the high boilers that do not come overhead are withdrawn through a waste line 14. By the use of subatmospheric or superatmospheric pressures, the distillation of the methylisobutylketone may be readily carried out at lower or higher temperatures. The vapors coming overhead flow through a conduit 15 into a condenser 16 wherein they are liquefied. The liquid then flows through a conduit 17 into a washer and phase separator 18 into which a stream of water is passed through a conduit 19. In the washer and phase separator 18, the water is brought into intimate contact with the methylisobutylketone and acts effectively to remove certain impurities therefrom. For best results, there should be employed for each volume of methylisobutylketone from about 1/30 to 1/60 volumes of water. The water is withdrawn from the base of the washer and phase separator 18 through a waste line 21 while a portion of the methylisobutylketone is withdrawn from the top of the said washer and is returned to the column 12 as reflux through a conduit 22. The distillation column 12 is operated at a reflux ratio of between about 5 to 1 and 10 to 1.

The remainder of the methylisobutylketone flows through a conduit 23 into a distillation column 24 equipped with a reboiler 25. The distillation column 24 is operated at a head temperature of between about 93 and 112° C. and a base temperature of between about 115 and 116° C. at atmospheric pressure to distill overhead materials boiling at a temperature below the boiling point of the methylisobutylketone together with a considerable proportion of methylisobutylketone. The vapors of these materials pass through a conduit 26 to a condenser 27 wherein they are liquefied. The liquid so obtained then flows through a conduit 28 to a washer and phase separator 29 into which a stream of water is entered through a conduit 31. The water removes from the liquid certain impurities contained therein. For best results, there should be employed between about 1/80 and 1/100 volumes of water for each volume of liquid. The water is withdrawn from the base of the washer and phase seperator 29 through a waste line 32. The washed liquid, which comprises primarily methylisobutylketone, is withdrawn from the top of the washer and phase separator 29 and is returned as reflux through a conduit 33 to the distillation column 24. If desired, the washer and phase separator 29 may be omitted, in which case a portion of the liquid from the condenser 27 is returned as reflux to the distillation column 24 to give a reflux ratio of between about 5 to 1 and 10 to 1, while the remainder of this liquid is recycled to the distillation column 12 through the feed line 11.

A highly purified methylisobutylketone is withdrawn from a point between the ends of the distillation column 24 through a conduit 34 and condenser 35. Any high boiling compounds that may still be present in the methyl isobutylketone are withdrawn from the base of the distillation column 24 through a conduit 36 and are recycled to the distillation column 12 through the feed line 11.

The following example is given to illustrate this invention further.

Example

Methylisobutylketone, produced by the hydrogenation of mesityl oxide and containing as impurities by weight somewhat less than 0.1% of hexylene glycol, 2.4% of acetone, 1.7% of isopropyl alcohol, 2.9% of water, 0.3% of mesityl oxide and 8.0% of methylisobutylcarbinol is entered at the rate of 100 parts by weight per hour into a 24 plate distillation column operated at a top temperature of 111 to 114° C. and a base temperature of 122 to 127° C. High boiling compounds are withdrawn from the base of the column at the rate of 15 pounds per hour. There are taken overhead 2200 parts by weight per hour of vapors and the said vapors, after being condensed, are extracted with 41 parts by weight per hour of water. After extraction, 1884 parts by weight per hour of methylisobutylketone are returned to the distillation column as reflux and 315 parts by weight per hour are sent to a 42 plate distillation column which is operated at a head temperature of 93 to 116° C. and a base temperature of 121 to 123° C. There are taken overhead 1580 parts by weight per hour of vapors which are condensed and are extracted with 19 parts by weight per hour of water. The extracted material is all returned to the column as reflux. Heavy ends are withdrawn from the base of the column at the rate of 231 parts by weight per hour and mixed with the fresh feed. Purified methylisobutylketone vapors are withdrawn from a point 12 plates from the base of the column at the rate of 77 parts by weight per hour and condensed. The product obtained contains by weight 99.7% of methylisobutylketone, less than 0.05% of water, less than 0.1% of mesityl oxide and 0.2% of methylisobutylcarbinol.

It is to be understood that the foregoing detailed description is merely given by way of illustration and that many variations may be made therein without departing from the spirit of my invention.

Having described my invention, what I desire to secure by Letters Patent is:

1. Process for the purification of methylisobutylketone prepared by the hydrogenation of mesityl oxide, which comprises distilling the methylisobutylketone to take overhead the methylisobutylketone and leave behind high-boiling impurities, extracting the distillate with water to remove impurities therefrom, again distilling the extracted methylisobutylketone to take overhead low-boiling impurities together with a considerable proportion of methylisobutylketone, returning a portion of the distillate to the second distillation as a reflux, and removing from the second distillation a side stream of purified methylisobutylketone.

2. Process for the purification of methylisobutylketone prepared by the hydrogenation of mesityl oxide, which comprises distilling the methylisobutylketone to take overhead the methylisobutylketone and leave behind high-boiling impurities, extracting the distillate with water to remove impurities therefrom, again distilling the extracted methylisobutylketone to take overhead low-boiling impurities together with a considerable proportion of methylisobutylketone, extracting the distillate with water to remove impurities therefrom, returning the extracted distillate to the second distillation as reflux, and removing from the second distillation a side stream of purified methylisobutylketone.

3. Process for the purification of methylisobutylketone prepared by the hydrogenation of mesityl oxide, which comprises distilling the methylisobutylketone to take overhead the methylisobutylketone and leave behind high-boiling impurities, extracting the distillate with water to remove impurities therefrom, returning a portion of the extracted distillate to the distillation as reflux, again distilling the extracted methylisobutylketone to take overhead low-boiling impurities together with a considerable proportion of methylisobutylketone, extracting the distillate with water to remove impurities therefrom, returning the extracted distillate to the second distillation as reflux, and removing from the second distillation a side stream of purified methylisobutylketone.

4. Process for the purification of methylisobutylketone prepared by the hydrogenation of mesityl oxide, which comprises distilling the methylisobutylketone to take overhead the methylisobutylketone and leave behind high-boiling impurities, extracting the distillate with water to remove impurities therefrom, returning a portion of the extracted distillate to the distillation as reflux, again distilling the extracted methylisobutylketone to take overhead low-boiling impurities together with a considerable proportion of methylisobutylketone, extracting the distillate with water to remove impurities therefrom, returning the extracted distillate to the second distillation as reflux, withdrawing high boilers from the second distillation and recycling the said high boilers to the first distillation, and removing from the second distillation a side stream of purified methylisobutylketone.

5. Process for the purification of methylisobutylketone prepared by the hydrogenation of mesityl oxide, which comprises distilling the methylisobutylketone to take overhead the methylisobutylketone and leave behind high-boiling impurities, extracting the distillate with from about 1/30 to 1/60 volumes of water for each volume of distillate to remove impurities therefrom, returning a portion of the extracted distillate to the distillation as reflux, again distilling the extracted methylisobutylketone to take overhead low-boiling impurities together with a considerable proportion of methylisobutylketone, extracting the distillate with from about 1/80 to 1/100 volumes of water for each volume of distillate to remove impurities therefrom, returning the extracted distillate to the second distillation as reflux, withdrawing high boilers from the second distillation and recycling the said high boilers to the first distillation, and removing from the second distillation a side stream of purified methylisobutylketone.

References Cited in the file of this patent

UNITED STATES PATENTS

| | | |
|---|---|---|
| 2,166,584 | Deanesly | July 18, 1939 |
| 2,477,087 | Robertson | July 26, 1949 |
| 2,568,522 | Steitz et al. | Sept. 18, 1951 |